United States Patent [19]

Mori

[11] Patent Number: 4,477,145

[45] Date of Patent: Oct. 16, 1984

[54] SUNLIGHT COLLECTING AND CONCENTRATING APPARATUS

[76] Inventor: Kei Mori, 3-16-3-501, Kaminoge, Setagaya-ku, Tokyo, Japan

[21] Appl. No.: 460,847

[22] Filed: Jan. 25, 1983

[30] Foreign Application Priority Data

Jul. 5, 1982 [JP] Japan ................ 57-116643

[51] Int. Cl.³ .............................. G02B 5/16
[52] U.S. Cl. .................. 350/96.10; 250/203 R; 126/439; 126/440; 126/441
[58] Field of Search ............... 350/96.10; 250/203 R, 250/203 S; 126/439, 438, 440, 441

[56] References Cited

U.S. PATENT DOCUMENTS

| | | | |
|---|---|---|---|
| 1,683,266 | 9/1928 | Shipman | 126/440 |
| 3,493,291 | 2/1970 | Webb | 126/440 |
| 3,998,204 | 12/1976 | Fuchs et al. | 126/440 |
| 4,026,267 | 5/1977 | Coleman | 126/440 |
| 4,043,315 | 8/1977 | Cooper | 126/440 |
| 4,056,093 | 11/1977 | Barger | 126/440 |
| 4,057,048 | 11/1977 | Maine | 126/440 |
| 4,062,346 | 12/1977 | Rapp, Jr. et al. | 126/441 |
| 4,136,670 | 1/1979 | Davis | 126/440 |
| 4,205,661 | 6/1980 | Chapman | 126/440 |
| 4,213,303 | 7/1980 | Lane | 126/440 |
| 4,267,823 | 5/1981 | Bohg et al. | 126/440 |
| 4,282,858 | 8/1981 | Bowers, Jr. | 126/440 |
| 4,409,963 | 10/1983 | Mori | 126/440 |

FOREIGN PATENT DOCUMENTS

57-14149  1/1982  Japan ................ 126/440

Primary Examiner—John D. Lee
Assistant Examiner—Brian M. Healy
Attorney, Agent, or Firm—Merchant, Gould, Smith, Edell, Welter & Schmidt

[57] ABSTRACT

A sunlight collecting and concentrating apparatus having a capsule enclosing lenses for collecting sunlight and a sensor for detecting changes in the sun's azimuth and altitude. The sunlight and ambient cold air are prevented from causing temperature fluctuations within the capsule, which would cause breakdowns and malfunctions of the sensor by provision of a suction pump or blower within the capsule to produce an air current around the sensor.

9 Claims, 3 Drawing Figures

SUNLIGHT COLLECTING AND CONCENTRATING APPARATUS

BACKGROUND OF THE INVENTION

1. Field of the Invention

The present invention relates to a sunlight collecting and concentrating apparatus. More particularly, the present invention relates to a sunlight collecting and concentrating apparatus provided with a capsule enclosing lenses for collecting sunlight and a sensor for detecting changes in the sun's azimuth and altitude.

2. Description of the Prior Art

In previous sunlight collecting and concentrating apparatuses of this type, the temperature within the capsule is raised by the sunlight or lowered by the surrounding cold air.

Such sunlight collecting and concentrating apparatuses have suffered from temperature-related breakdowns and malfunctions of the sensor. To prevent such breakdowns and malfunctions and also to prevent deterioration of the sensitivity of the sensor, the air in the capsule must be controlled to a proper level.

SUMMARY OF THE INVENTION

The present invention is intended to overcome this defect of the prior technique. According to the present invention, there is provided a sunlight collecting and concentrating apparatus wherein the temperature within the capsule can be maintained to a proper level. This prevents temperature-related breakdowns and malfunctions of the sensor and temperature-related deterioration of the sensitivity of the sensor.

BRIEF DESCRIPTION OF DRAWINGS

The invention will be more fully understood from the following detailed description taken in conjunction with the accompanying drawings, in which.

DESCRIPTION OF THE PREFERRED EMBODIMENT

Figure 1:
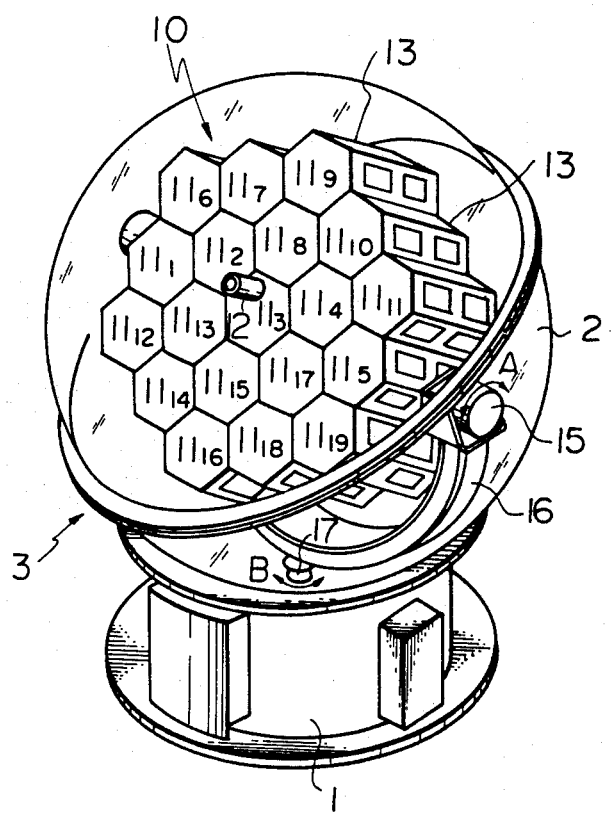
FIG. 1 is a general perspective view of the structure of a previous sunlight collecting and concentrating apparatus of the type of the present invention.

FIG. 1 is a perspective view of a sunlight collecting and concentrating apparatus previously proposed by the present inventor.

Referring to FIG. 1, there is shown a capsule 3 for a sunlight collecting and concentrating apparatus comprised of hollow cylindrical base member 1 and transparent head member 2 formed in the shape of a sphere or dome and mounted on base member 1. The head member 2 has a sunlight collecting and concentrating means 10 enclosed therein.

The sunlight collecting and concentrating means 10 includes a plurality of lenses $11_1, 11_2 \ldots 11_{19}$ (e.g., 19 in number) arranged substantially in the form of concentric circles and integrally connected with each other for collecting sunlight; a tracking sensor 12 for detecting the sun's azimuth and attitude; holding frames 13 integrally holding said lenses $11_1, 11_2 \ldots 11_{19}$ and the tracking sensor 12; first motors 15 for turning the lenses $11_1, 11_2 \ldots 11_{19}$, tracking sensor 12, and holding frames 13 in both directions indicated by double arrow A; a support arm 16 for supporting the lenses $11_1, 11_2 \ldots 11_{19}$, tracking sensor 12, holding frames 13, and first motors 15; a rotatable shaft 17 disposed perpendicularly to a rotational axis of the first motors 15 as well as supporting the support arm 16; and a second motor (not shown) for turning the rotatable shaft 17 in both directions indicated by double arrow B.

When the sun's azimuth and altitude are detected by the tracking sensor 12, the first and second motors are controlled by the output signals produced thereby so that the lenses $11_1, 11_2 \ldots 11_{19}$ can continuoulsy track the movement of the sun. The sunlight collected by the lenses $11_1, 11_2 \ldots 11_{19}$ is introduced into optical conductor cables (not shown) or the like, 19 in number in the example of FIG. 1, with inlet ends disposed at the focal positions of each of the lenses, and is propagated through the optical conductor cables to any place desired, for example, to somewhere illumination is desired.

The sunlight collecting and concentrating means 10 is hermetically sealed in the transparent head member 2 to protect it from wind, rain, and dust. Therefore, the temperature within the head member 2 may considerably rise due to the sunlight or abnormally fall due to the surrounding cold air. This exerts many harmful influences upon devices in the head member 2. In particular, extreme temperature fluctuations hinder the ability of the tracking sensor 12. This results in a lower collecting efficiency of the apparatus.

The present invention overcomes this defect by producing an air current around the tracking sensor so as to protect it from extremes of temperature and to keep the operation of the tracking sensor normally. Therefore, the sunlight collecting and concentrating apparatus can continuously collect sunlight at a high efficiency.

Figure 2:
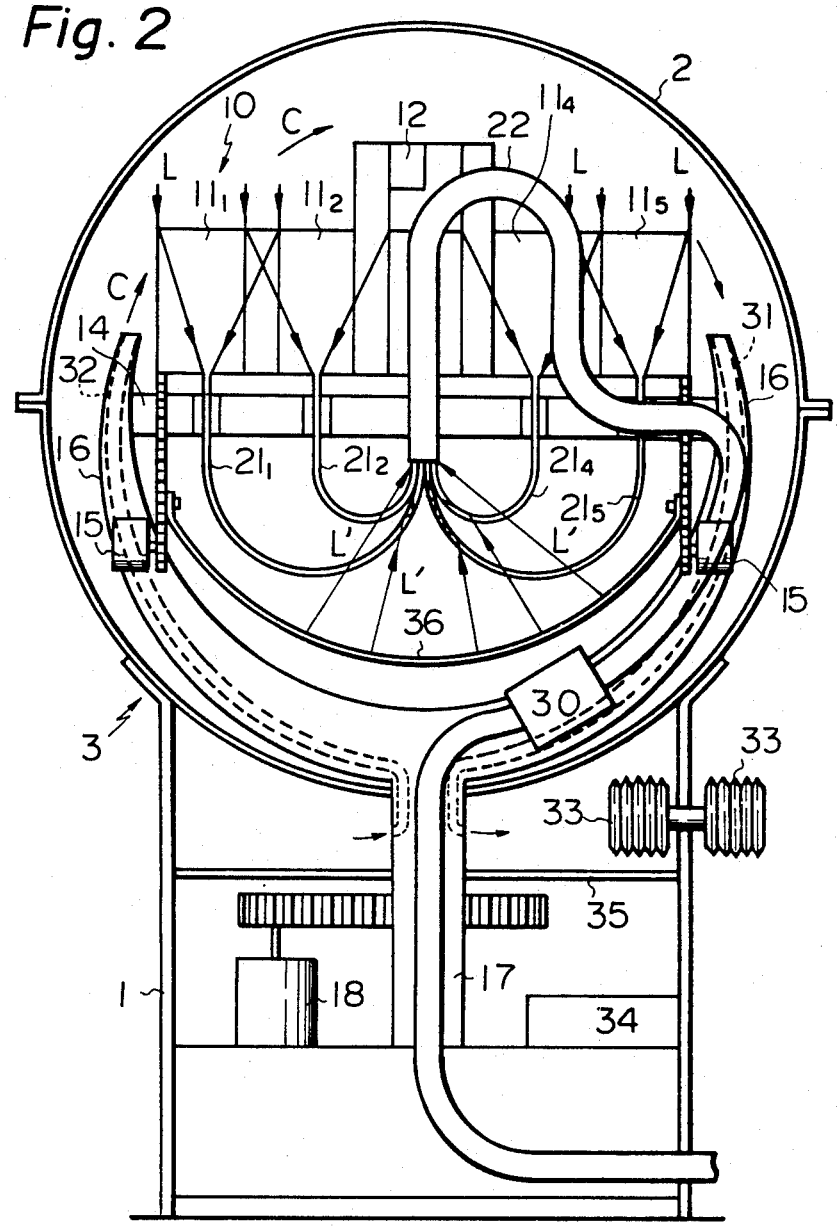
FIG. 2 is a side elevational view, partly in cross-section partly schematic, of an embodiment of the sunlight collecting and concentrating apparatus according to the present invention.

FIG. 2 is a side elevational view, partly in cross-section, partly schematic, of an embodiment of the sunlight collecting an concentrating apparatus according to the present invention. Reference numeral 14 represents a first rotatable shaft driven by first motors 15. Reference numeral 18 represents a second motor for driving a second rotatable shaft 17. Lenses $11_1, 11_2, 11_4,$ and $11_5$ correspond to the lenses $11_1, 11_2, 11_4,$ and $11_5$ shown in FIG. 1. The sunlight L collected by these lenses $11_1$ to $11_5$ (no lens $11_3$) is introduced into optical conductor cables $21_1$ to $21_5$ (no cable $21_3$) with inlet ends disposed at focal positions of each of the lenses. In the present invention, the area corresponding to the lens $11_3$ shown in FIG. 1 is occupied by a single major optical conductor cable 22. The single major optical conductor cable 22 will be fully described later.

Figure 3:
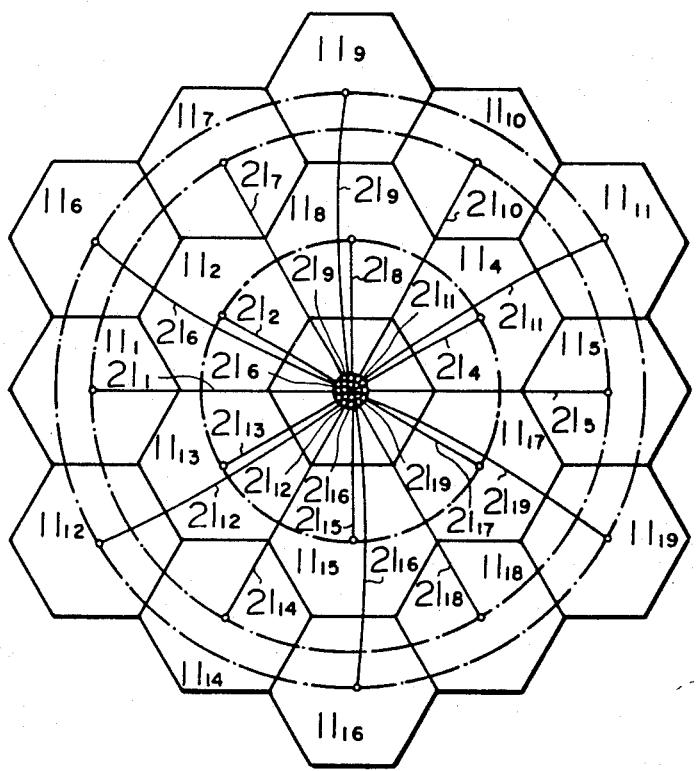
FIG. 3 is a pictorial rear view of the lens system of the embodiment shown in FIG. 2.

FIG. 3 is a rear view of the lens system including a plurality of such lenses. As shown in FIG. 3, 18 lenses $11_1 \ldots 11_{19}$ (no lens $11_3$) are substantially arranged in the form of concentric circles with common axes. The inlet end of each of the optical conductor cables $21_1 \ldots 21_{19}$ (no cable $21_3$) is disposed at focal positions of each of the lenses. The outlet ends of the optical conductor cables $21_1$ to $21_{19}$ are gathered at the central portion of the lens system. The gathered optical conductor cables are connected to a single major optical conductor cable 22 at the central portion. The sunlight is propagated through the single major optical conductor cable 22 to any place desired, for example, to somewhere where illumination is desired.

As mentioned above, the sunlight collected by a plurality of lenses $11_1$ to $11_{19}$ is introduced to the optical conductor cables $21_1$ to $21_{19}$ disposed at respective lenses $11_1$ to $11_{19}$. The outlet ends of the cables are gathered at the central portion of the lens system arranged in the form of concentric circles. Finally, the gathered optical conductor cables are connected to the single major optical conductor cable 22 at the central portion, so as to convey the sunlight to any place desired. Therefore, distribution of the optical conductor cables is considerably easy. For the optical guide, an optical conductor rod can be used in place of the optical conductor cable. This results in low cost of the optical conductor material.

Even with the tracking sensor provided in the sunlight collecting and concentrating apparatus for detecting the sun's azimuth and altitude and for enabling the lenses to continuously track the movement of the sun, it is almost impossible for the lenses to collect all of the sunlight incident with the head member enclosing the sunlight collecting and concentrating means. Left to itself, the sunlight would raise the temperature within the head member and exert a harmful influence upon the apparatus, in particular upon the tracking sensor. As shown in FIG. 2, when the axis of the lenses is directed to the meridian sun, the tracking sensor is positioned at the apex point whithin the capsule. In such a case, the temperature at the apex point is raised considerably.

Reference numerals 31 and 32, are air supply passages formed inside the support arm 16. One end of each these passages 31 and 32 is opened within the head member 2. Each other end is opened within the base member 1. On the passage 31, there is provided a suction pump 30. Reference numeral 33 denotes a heat exchanger provided within the base member 1.

When the air within the head member 2 is heated by the sunlight incident therethrough, the suction pump 30 operates to introduce the hot air from the head member 2 into the base member 1 through the passage 31 formed inside the support arm 16. Then, the introduced hot air is cooled by the heat exchanger 33 provided within the base member 1. The cooled air is returned from the base member 1 into the head member 2 through the passage 32 formed inside the support arm 16, this operation is caused by the vacuum produced around the tracking sensor 12. At that time, as shown by arrow C in FIG. 2, the cooled air passed through the passage 32 will be blown against the tracking sensor 12.

The above produces a strong air current in the region of the tracking sensor 12 and disperses the hot air therearound, preventing an unwanted rise of the air temperature around the tracking sensor 12. As already described, the dispersed hot air is introduced into the base member 1, within which the air is cooled by the heat exchanger 33. Accordingly, the air temperature around the tracking sensor 12 can be maintained at a predetermined level.

Within the base member 1, a control circuit 34 is provided. The control circuit 34 operates, as is well known, to receive signals indicating the sun's azimuth and altitude from the tracking sensor 12 and to control the motors 15 and 18 for driving the apparatus to precisely track the movement of the sun. If the hot air supplied through the passage 31 were to blow against the control circuit 34, this would cause circuit malfunctions. The present invention overcomes this defect by providing a partition 35 dividing the space of the base member 1 into two compartments.

In addition to the problem with sunlight not collected by the lenses, there is a problem with sunlight collected by the lenses but not captured by the optical conductor cables. Furtheremore, the focal image of skylight is too large to introduce into the optical conductor cables. Such sunlight and skylight are also transformed into heat energy to raise the temperature within the head member 2. To reduce such harmful influences, a collecting and reflecting plate 36 in the form of concave mirror is provided within the head member 2. In FIG. 2, L', L' ... represent light from the skylight which could not be captured by the optical conductor cables and were reflected by the plate 36. The collecting and reflecting plate 36 is disposed at the rear side of the plurality of lenses $11_1$ ... and the optical conductor cables $21_1$ ... and is integrally formed with the first rotatable shaft 14.

On the other hand, outlet ends of the optical conductor cales $21_1$ ... are gathered and connected to the single major optical conductor cable 22 at the center position of the plurality of lenses $11_1$ ... The gathered optical conductor cables $21_1$ ... are stripped of their cladding layers (not shown) at least at portions adjacent to the central position. Thus, reflected light L', L' ... are completely captured into outlet ends of the respective optical conductor cables $21_1$, $21_2$, $21_4$, $21_5$ ..., then of the single major optical conductor cable 22. This further prevents extreme temperature rises within the head member 2, and allows a further increase of the collecting efficiency of the apparatus.

In this embodiment, the suction pump 30 is provided on the passage 31. It will be noted, however, that the present invention is not limited to this embodiment. Instead of the suction pump 30, a blower or both a suction pump and blower may be provided on the passage 31.

Also in this embodiment, the passages 31, 32 are formed inside the support arm 16, and the tracking sensor 12 is provided at the center of the lens system. However, the passages do not necessarily have to be inside the support arm, also the tracking sensor does not always have to be provided at the center of the lens system.

Generation of the air current may be effected continuously or intermittantly. Furthermore, a temperature sensitive sensor may be provided within the head member 2 advantageously, adjacent to the tracking sensor 12, so as to generate the air current only when the temperature within the head member differs from the predetermined level.

When the tracking sensor is provided at the central portion of the lens system and when the axis of the lens system is directed to the meridian sun, the temperature around the tracking sensor will reach its highest degree, i.e., at midday, the tracking sensor will most approach the apex within the capsule, which has the highest temperature. To detecting when the axis of the lens system is closest to the meridian sun and start the air current blowing against the tracking sensor, a microswitch or the like may be provided on the first or second rotatable shafts.

The above-mentioned embodiment was mainly described in reference to air cooling within the head member. However, it can readily be understood that the heat energy can be positively extracted from the head member both for lowering of the temperature therein and utilization for other purposes. Further, if the temperature of the ambient air surrounding the head member is very low, the temperature therein becomes abnormally low, which may also cause breakdowns and malfunctions of the tracking sensor 12. In such a case, heat energy from an outside heat source (not-shown) may be supplied through the passages 31, 32 and heat exchanger 33 into the head member to maintain the temperature at the proper level.

As can readily understood from the above, according to the present invention, the temperature within the head member, particularly, extremes of temperature around the tracking sensor, may be effectively controlled so as to prevent breakdowns and malfunctions. Thus, the efficiency of the apparatus can be increased.

Furthermore, according to the special arrangement of the optical conductor cables and the collecting and reflecting plate of the present invention, the sunlight collected by the lens system may be efficiently introduce into the optical conductor cables.

The invention has been described in detail with reference to preferred embodiments thereof, but it will be undertstood that reasonable variations and modifications are possible without departing from the spirit and scope of the invention.

I claim

1. A sunlight collecting and concentrating apparatus comprising:
   a lens means for collecting sunlight;
   a sensor means for detecting the sun's azimuth and altitude;
   an optical conductor means to which the sunlight collected by said lens means is introduced;
   a first rotatable shaft for turnably supporting said lens means together with integrally constructed means thereto;
   a support arm for turnably supporting said first rotatable shaft;
   a second rotatable shaft for turnably supporting said support arm about an axis perpendicular to the axis of said first rotatable shaft; and
   a capsule, in which all of the above are hermetically sealed; wherein when the sun's azimuth and altitude are detected by said sensor means, the turning of said first and second rotatable shafts is controlled to cause said lens means to face the position of the sun so as to introduce the collected sunlight by said lens means into said optical conductor means; characterized in that:
   a suction pump or blower is provided within said capsule so as to produce an air current around said sensor means, and to effectively maintain the temperature around the sensor means to a proper level.

2. The sunlight collecting and concentrating apparatus as claimed in claim 1, in which said lens means comprises a plurality of lenses substantially arranged in the form of concentric circles, and in which said optical conductor means comprises a plurality of optical conductor cables, the inlet end of said cables disposed at the focal positions of each of the lenses and the outlet ends connected to a single major optical conductor cable provided coaxially through the inside of the first rotatable shaft.

3. The sunlight collecting and concentrating apparatus as claimed in claim 2, in which said single major optical conductor cable is provided through the support arm and coaxially through the inside of the second rotatable shaft.

4. The sunlight collecting and concentrating apparatus as claimed in claim 2, in which said sensor means is disposed substantially at the central portion of the concentric circles formed by the plurality of lenses.

5. The sunlight collecting and concentrating apparatus as claimed in claim 4, in which said air current begins to be produced around said sensor means when the axis of the lens means is directed to a meridian sun.

6. The sunlight collecting and concentrating apparatus as claimed in claim 1, in which the suction pump or blower is provided on said support arm to effect the air current around the sensor means through passages formed inside the support arm.

7. The sunlight collecting and concentrating apparatus as claimed in claim 1, in which said capsule comprises a transparent head member formed in the shape of sphere for enclosing a sunlight collecting and concentrating means and a base member for supporting the head member, said base member being provided with a heat exchanger, whereby the air within the head member may be cooled or heated within the base member and be returned again into the head member.

8. The sunlight collecting and concentrating apparatus as claimed in claim 7, in which said base member is provided with an isolated compartment for receiving said heat exchanger, so as to effect heat exchanging between said compartment and the ambient air.

9. In a sunlight collecting and concentrating apparatus comprising:
   a plurality of lenses for collecting sunlight;
   a tracking sensor for detecting the sun's azimuth and altitude;
   a plurality of optical conductor cables oppositely disposed to respective lenses, into which the sunlight collected by the lenses are introduced;
   a single major optical conductor cable connected to said plurality of optical cables, into which the sunlight conveyed through said plurality of optical conductor cables is introduced;
   a first rotatable shaft for turnably supporting lenses together with the integrally constructed members thereto;
   a support arm for turnably supporting said first rotatable shaft;
   a second rotatable shaft for turnably supporting said support arm about an axis perpendicular to the axis of said first rotatable shaft; and
   a transparent capsule, in which all of the above are hermetically sealed;
   wherein when the sun'azimuth and altitude are detected by said tracking sensor, the turning of said first and second rotatable shafts is controlled to cause lenses to face the position of the sun so as to introduce the collected sunlight by said lenses into said optical conductor cables; the improvment comprising:
   at the rear side of the space formed by the plurality of lenses and optical conductor cables, a collecting and reflecting plate integrally turnable with said first rotatable shaft is provided and, substantially at the central position of the concentric circles formed by the plurality of lenses, the outlet ends of said optical conductor cables are connected to said single major optical conductor cable with its inlet end facing to the reflecting surface of said collecting and reflecting plate; said optical conductor cables being stripped of their cladding layers at least at portions adjacent to said central position, so as to introduce uncaptured light at the inlet ends of the optical conductor cables into said cables through the collecting and reflecting plate and to effectively maintain the temperature around the tracking sensor to a proper level.

* * * * *

UNITED STATES PATENT AND TRADEMARK OFFICE
CERTIFICATE OF CORRECTION

PATENT NO.   : 4,477,145
DATED        : October 16, 1984
INVENTOR(S)  : Kei Mori It is certified that error appears in the above-identified patent and that said Letters Patent is hereby corrected as shown below:

Column 2, line 13, "continuoulsy" should be --continuously--;

Column 2, line 20, after "somewhere" insert --where--;

Column 3, lines 27, "whithin" should be --within--;

Column 3, line 30, after "each" insert --of--;

Column 4, line 18, "cales" should be --cables--;

Column 4, line 44, "intermittantly" should be "intermittently--;

Column 4, line 56, "detecting" should be --detect--;

Column 5, line 7, after "can" insert --be--;

Column 5, lines 16-17, "introduce" should be --introduced--;

Column 6, line 45, "sun'azimuth" should be --sun's azimuth--.

Signed and Sealed this

Twenty-fifth Day of June 1985

[SEAL]

Attest:

DONALD J. QUIGG

*Attesting Officer*   *Acting Commissioner of Patents and Trademarks*